(12) United States Patent
Boyd

(10) Patent No.: US 8,628,066 B2
(45) Date of Patent: Jan. 14, 2014

(54) COOLING TOWER AND METHOD OF CONSTRUCTING SAME

(76) Inventor: Kelly M. Boyd, Chickasha, OK (US)

( * ) Notice: Subject to any disclaimer, the term of this patent is extended or adjusted under 35 U.S.C. 154(b) by 490 days.

(21) Appl. No.: 12/961,253

(22) Filed: Dec. 6, 2010

(65) Prior Publication Data

US 2011/0210456 A1 Sep. 1, 2011

Related U.S. Application Data

(60) Provisional application No. 61/283,537, filed on Dec. 5, 2009.

(51) Int. Cl.
*B01F 3/04* (2006.01)

(52) U.S. Cl.
USPC .................. 261/30; 261/112.1; 261/DIG. 11

(58) Field of Classification Search
USPC .................. 261/30, 97, 110, 112.1, DIG. 11
See application file for complete search history.

(56) References Cited

U.S. PATENT DOCUMENTS

| | | | | |
|---|---|---|---|---|
| 2,636,371 A | * | 4/1953 | Stephens | 62/314 |
| 4,094,937 A | * | 6/1978 | Bodick et al. | 261/111 |
| 4,543,218 A | * | 9/1985 | Bardo et al. | 261/24 |
| 4,720,358 A | * | 1/1988 | Cropp | 261/111 |
| 4,737,321 A | * | 4/1988 | McCloskey et al. | 261/109 |
| 5,545,356 A | * | 8/1996 | Curtis et al. | 261/23.1 |
| 5,958,306 A | * | 9/1999 | Curtis | 261/30 |

* cited by examiner

*Primary Examiner* — Charles Bushey
(74) *Attorney, Agent, or Firm* — Dunlap Codding, P.C.

(57) ABSTRACT

A cooling tower including an enclosure, a body of fill material supported inside the enclosure, a liquid distribution system supported above the fill material having a liquid distribution header, and a fan assembly mounted directly to the header for drawing air upward through the fill material, and a drainage collection system located below the fill material. The liquid distribution system includes a liquid distribution header comprising at least one feeder conduit encased in a monolithic casting of concrete. The liquid distribution system distributes a liquid over the fill material in such a way that the liquid gravitates downward through the fill material. The header traverses the enclosure and is supported by the enclosure. The fan assembly draws air upwards through the fill material. The drainage collection system collects the liquid that gravitates through the fill material.

10 Claims, 14 Drawing Sheets

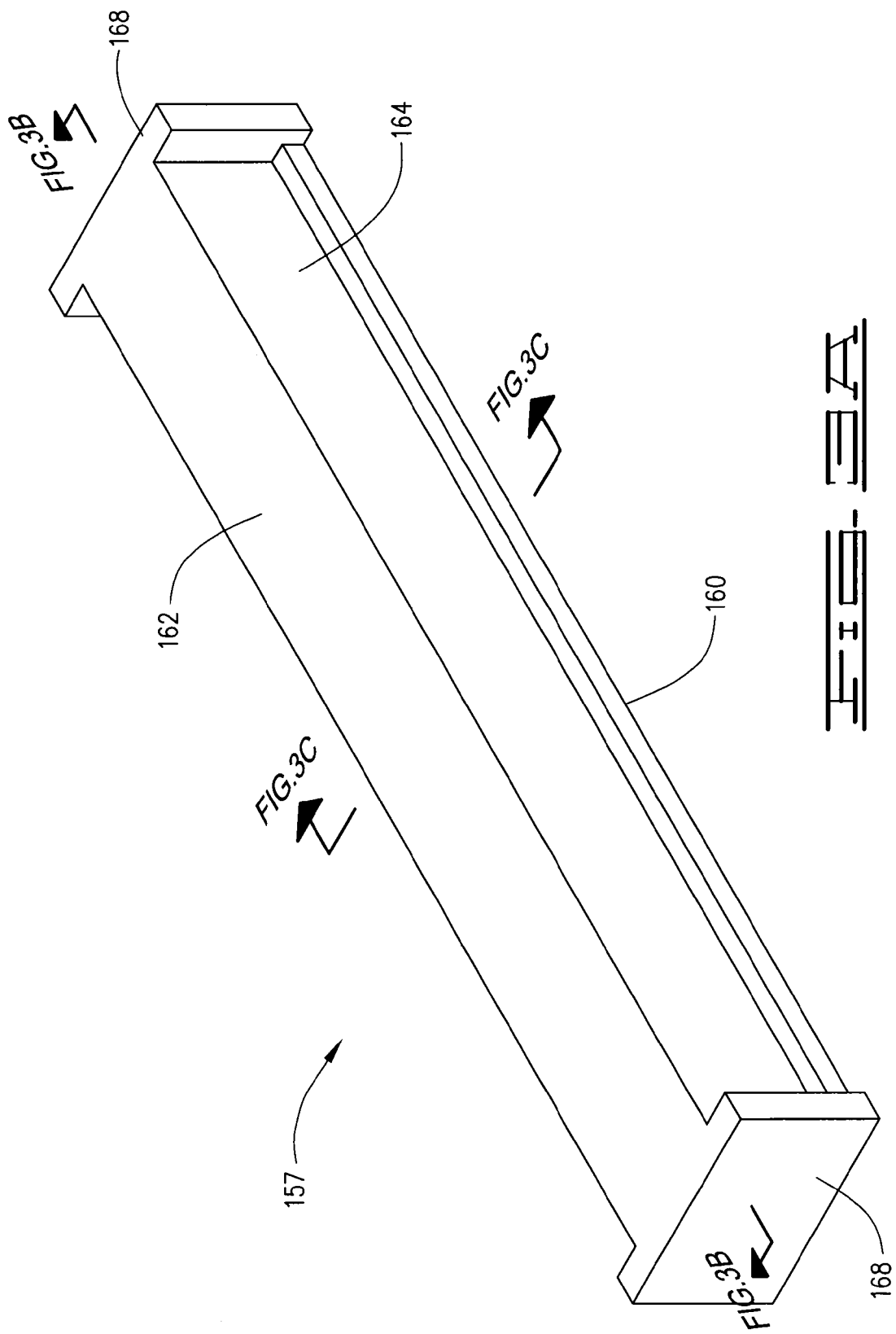

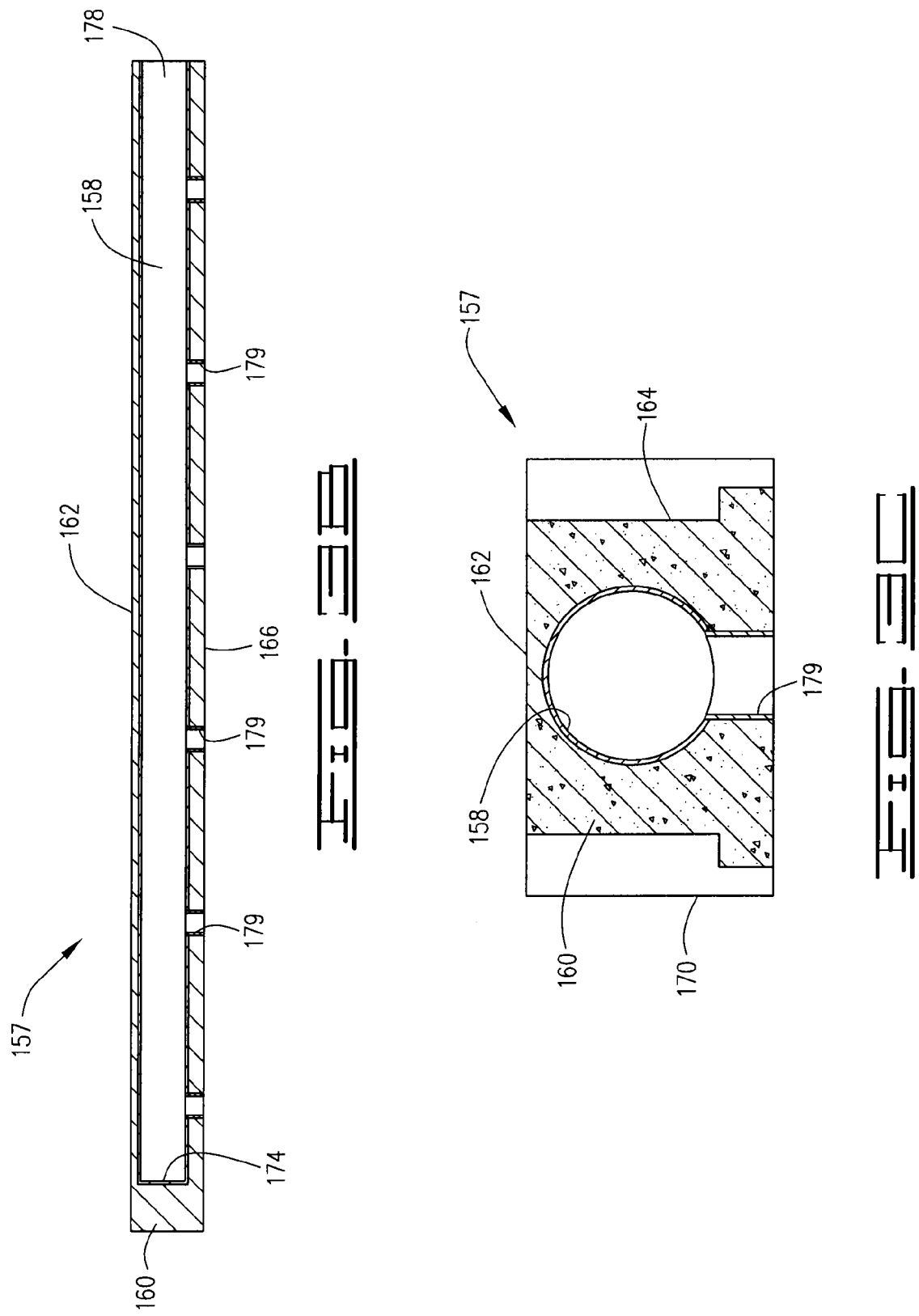

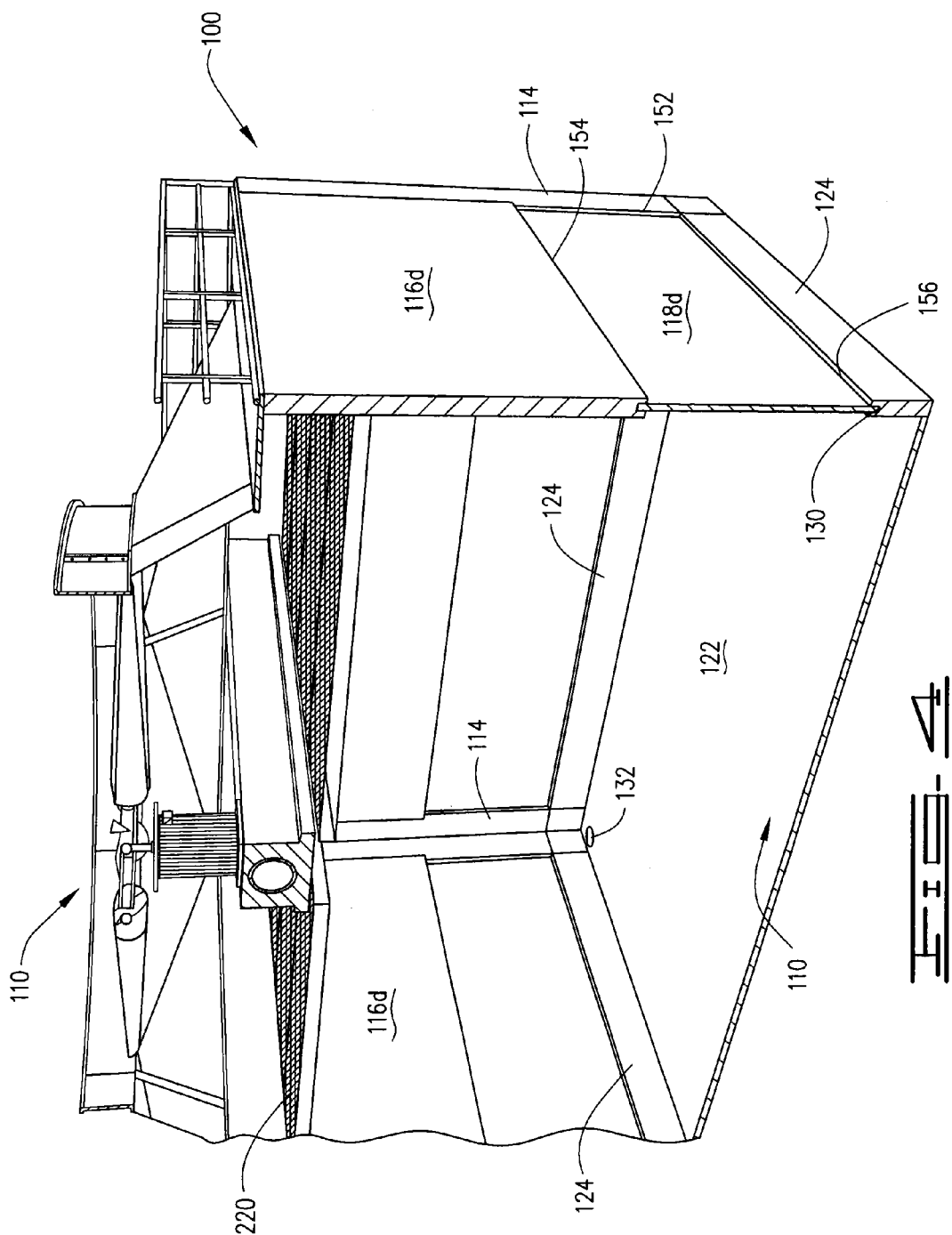

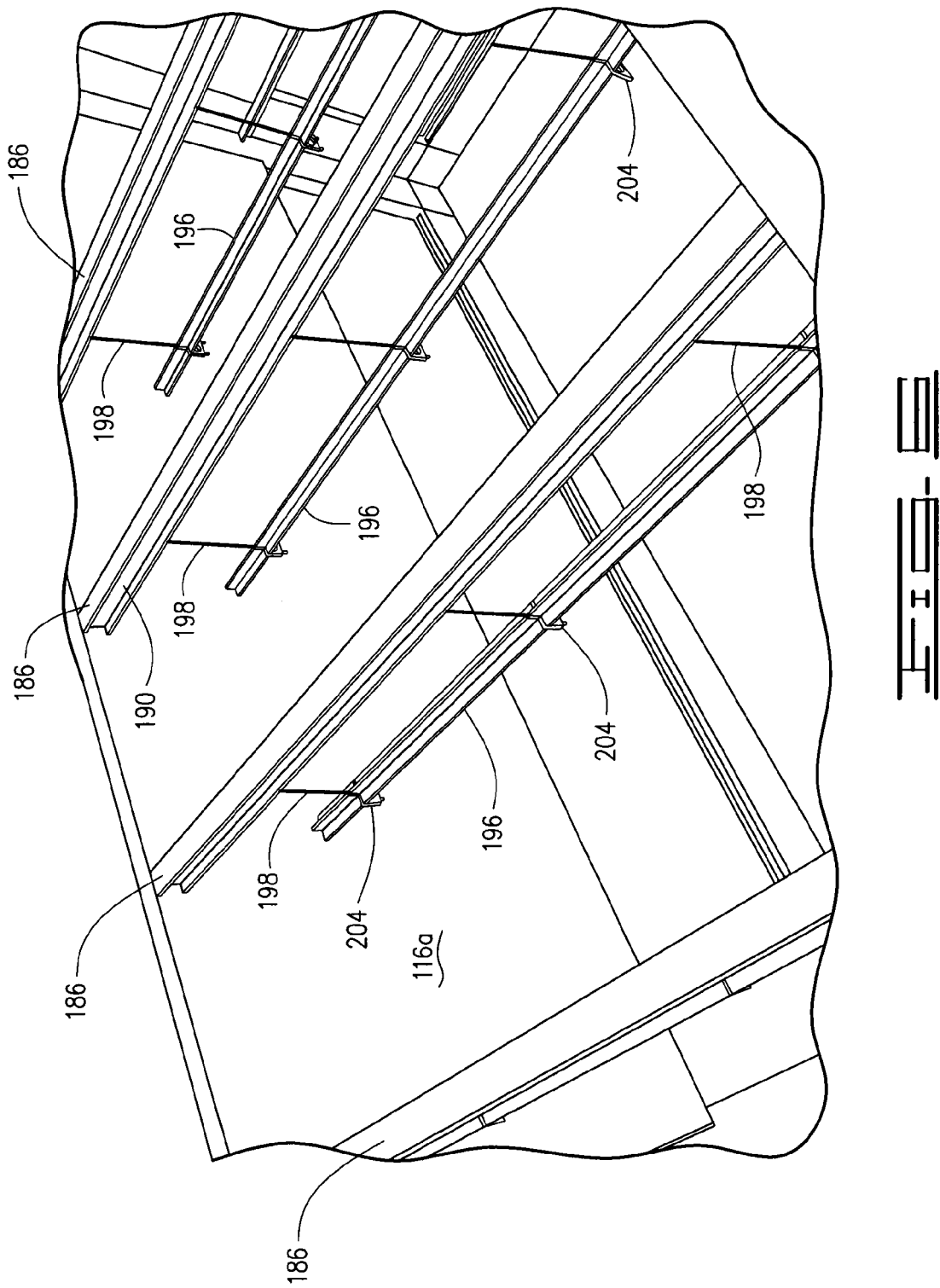

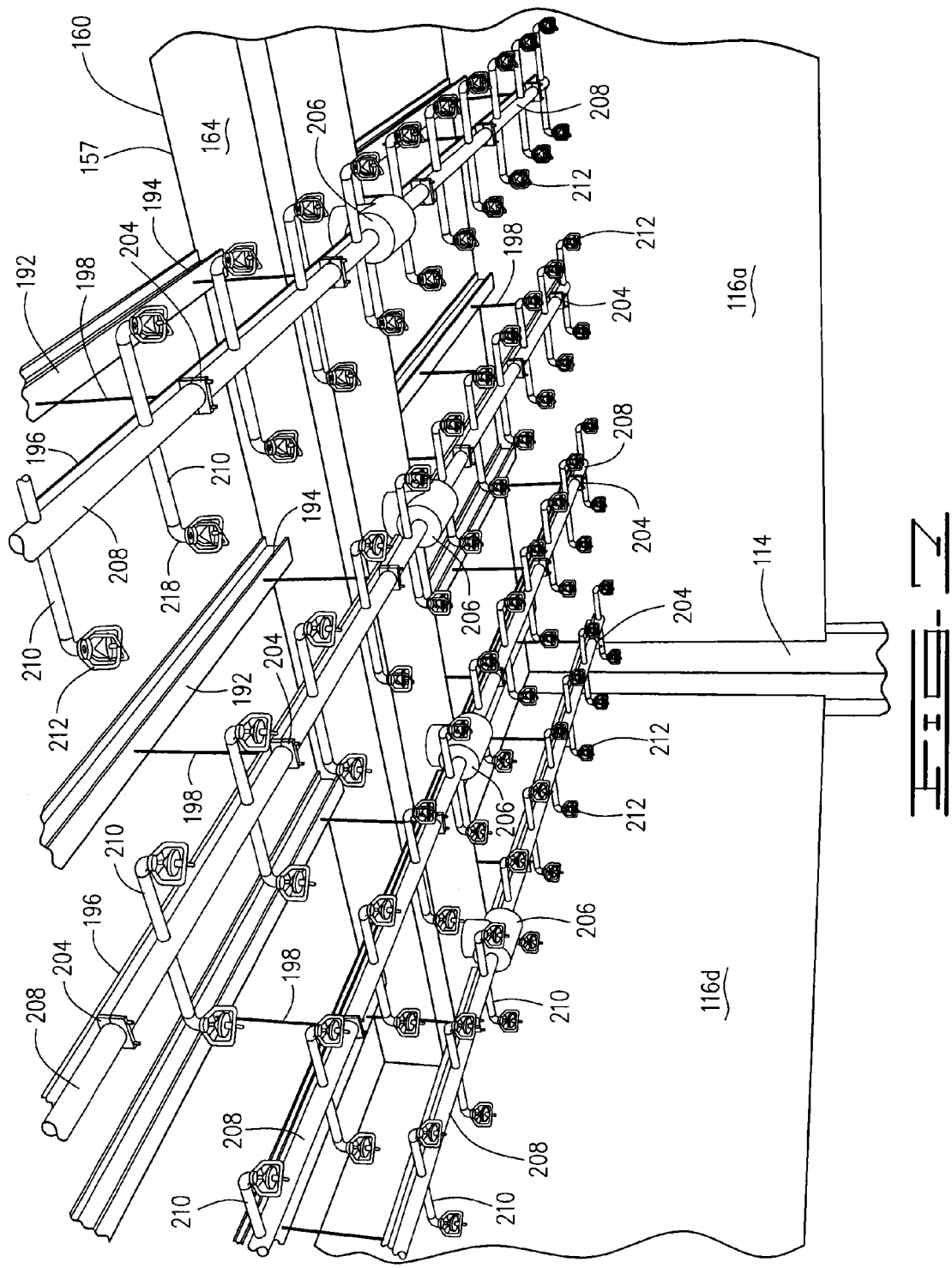

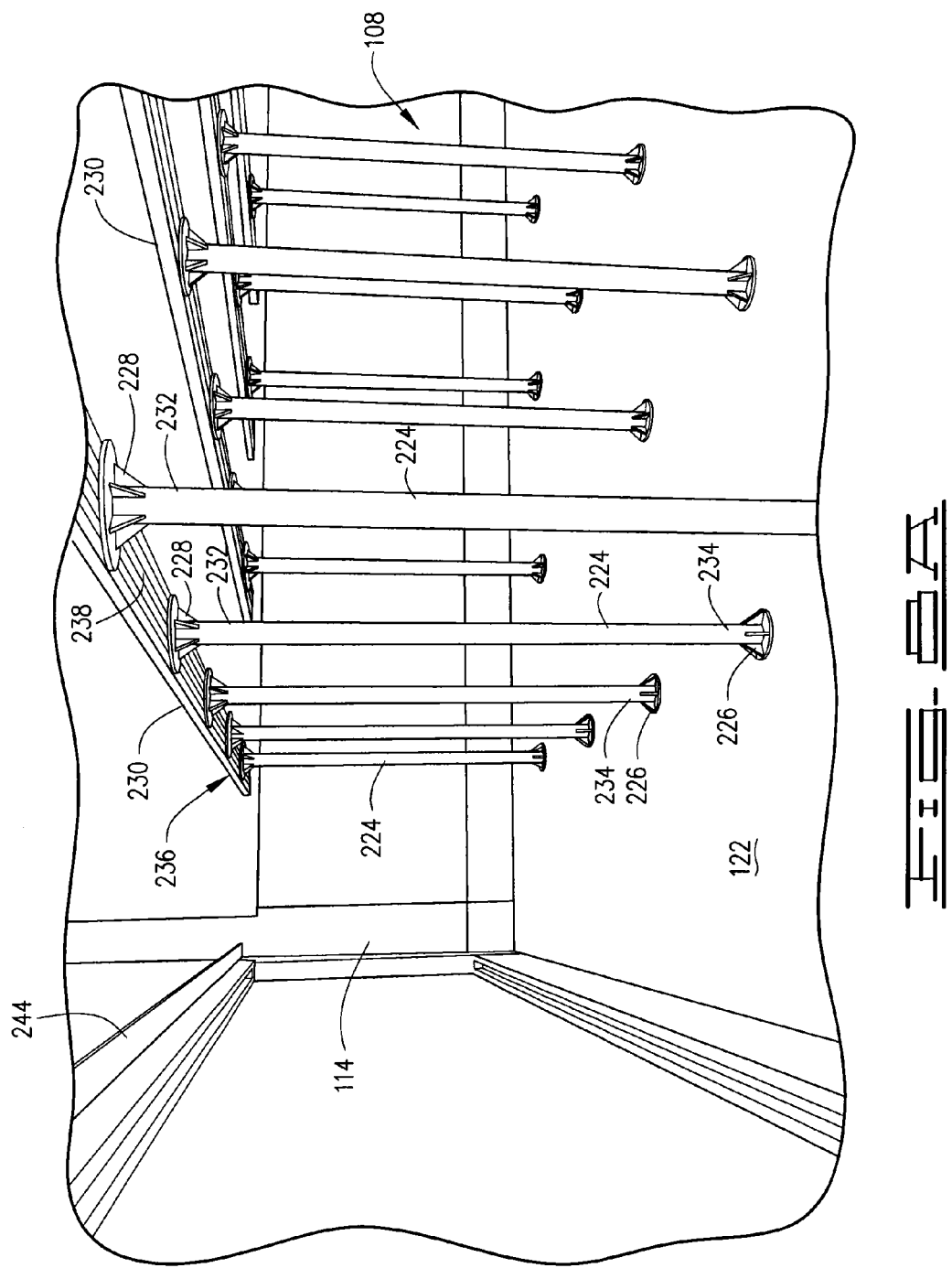

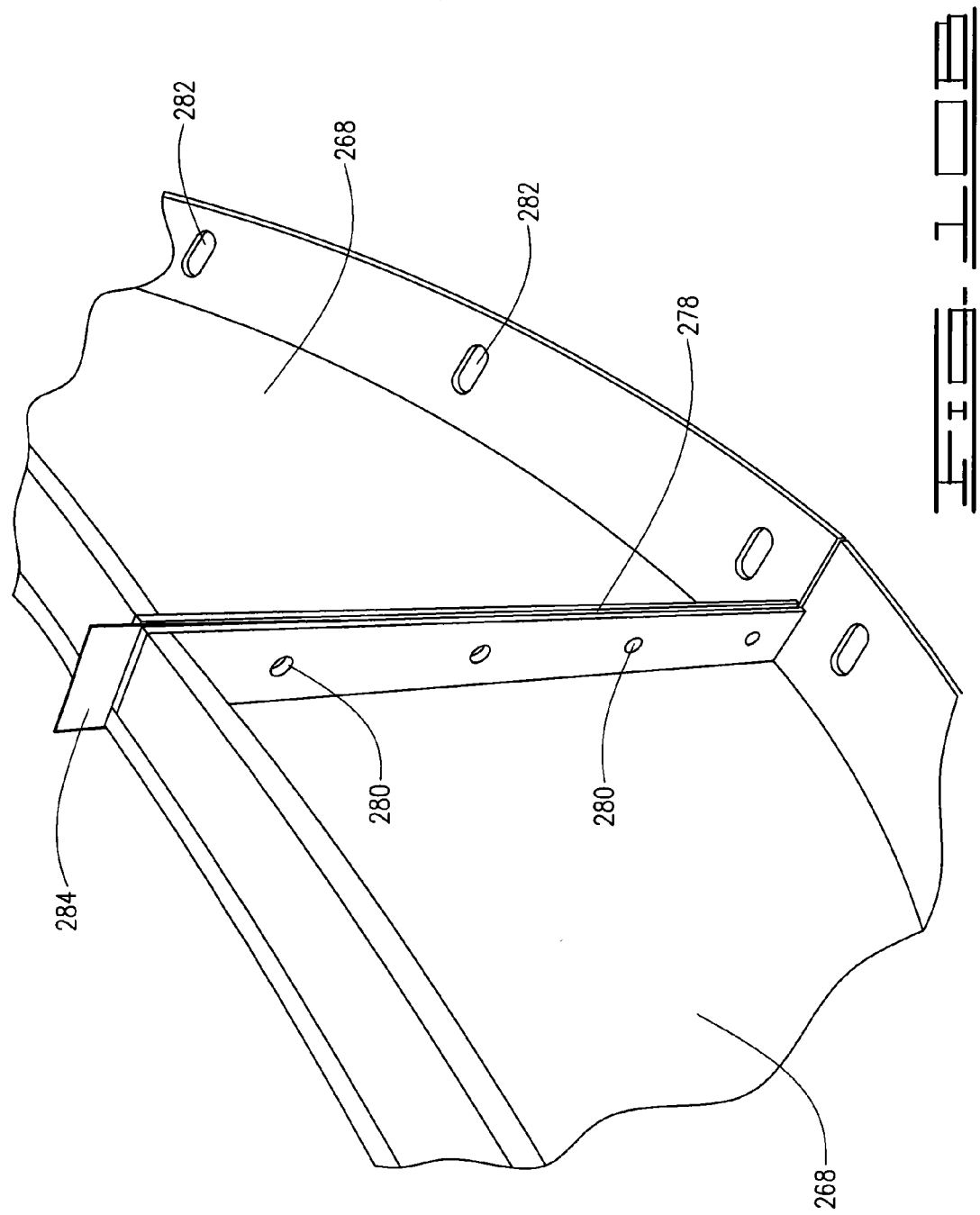

COOLING TOWER AND METHOD OF CONSTRUCTING SAME

CROSS-REFERENCE TO RELATED APPLICATIONS

The present application claims priority to the provisional patent application identified by U.S. Ser. No. 61/283,537 filed on Dec. 5, 2009, which is hereby incorporated herein by reference.

BACKGROUND OF INVENTIVE CONCEPTS

1. Field of the Disclosure

The inventive concepts disclosed herein relate to cooling towers, and more particularly, but not by way of limitation, to a modular concrete induced draft water cooling tower capable of being constructed substantially on site.

2. Brief Description of Related Art

Counterflow water cooling towers traditionally have been of three types, namely forced draft, natural draft, and induced draft. Forced draft towers have fans located on the sides below the fill material with air turning vanes or they may have fans situated directly below the fill material with a water/air separation system. An example of a forced draft counterflow cooling tower is disclosed in U.S. Pat. No. 5,545,356, which is hereby expressly incorporated herein by reference.

Natural draft counterflow cooling towers are utilized in many large coal or nuclear power plants and they do not use a fan to assist the air flow, but instead rely upon the natural tendency of less dense, warmer air to flow upward from lower level side openings to a less dense environment at the top. Although savings in electric usage are experienced, the upfront cost of construction of these extremely tall hyperbolic natural draft concrete towers is significant, and thus prohibitive in many instances.

An induced draft counter flow cooling tower has a fan located on top of the tower which draws air upward through a fill material. Air flows laterally along the ground surface adjacent to the tower module(s) and once in the tower, the air turns ninety degrees or greater and flows upward through the fill material. At the same time, the air flows upward through the fill material, water flows downward through the fill material under the force of gravity, hence the title "counterflow" in that the air and the water are moving in opposite directions.

Another common type of cooling tower is a cross flow tower. These cross flow cooling towers are usually induced draft towers which have a plenum chamber and fan located on top of the tower pulling the air up through the tower. Cross flow cooling towers have the warmer water falling downward through fill material while cooling air is drawn in horizontally at approximately ninety degrees to the path of the falling water. This requires specialized fill to achieve optimal results.

Typically industrial cooling towers are large structures having footprint dimensions on the order of forty feet to as much as six hundred feet and having a height on the order of twenty to thirty feet. The construction of such a large tower is a major undertaking, with the delay between the time of order and the time of complete construction and on-line operation being on the order of one year minimum.

Common cooling tower construction utilizes either top mounted fans with wood framed or cast-in-place concrete for large towers. Fiberglass-reinforced plastic (hereinafter referred to as "FRP") or sheet metal, or combinations of these, are used for small towers manufactured in a plant and transported generally by truck to the project location. Other construction methods may comprise precast construction with an elevated trough system for water collection with a bottom mounted fan and no ground level basin below the tower. These structures have in the past been typically constructed of wood. However, wood structures typically have a limited life span and significant maintenance requirements due to wood deterioration in a water environment. Although there are instances of concrete cooling towers, these have typically been custom designed cast-in-place towers that are very expensive to build, and have pumping height requirements similar to the wood towers, which is a major drawback due to the overall configuration and height.

Accordingly, a need exists for a cooling tower capable of being constructed substantially on site, which is inexpensive to build, durable, and capable of modular expansion. It is to such an apparatus and method that the inventive concepts disclosed herein are directed.

BRIEF DESCRIPTION OF THE DRAWINGS

Like reference numerals in the figures represent and refer to the same element or function. Implementations of the disclosure may be better understood when consideration is given to the following detailed description thereof. Such description makes reference to the annexed pictorial illustrations, schematics, graphs, drawings, and appendices. In the drawings:

FIG. 3A is a perspective view of a header assembly.

FIG. 3B is a cross-sectional view taken along line 3B-3B in FIG. 3A.

FIG. 3C is a cross-sectional view taken along line 3C-3C in FIG. 3A

FIG. 4 is a cutaway, perspective view of a partially constructed cooling tower.

FIG. 6 is a perspective view of a water distribution support assembly.

FIG. 7 is a bottom perspective view of the water distribution assembly.

FIG. 8A is a bottom perspective view of a fill support assembly.

FIG. 8B is a top perspective view of the fill support assembly.

FIG. 10B is an enlarged, perspective view of the shroud assembly illustrating a shim positioned between two sections of the shroud assembly.

DETAILED DESCRIPTION OF EXEMPLARY EMBODIMENTS

Figure 1:
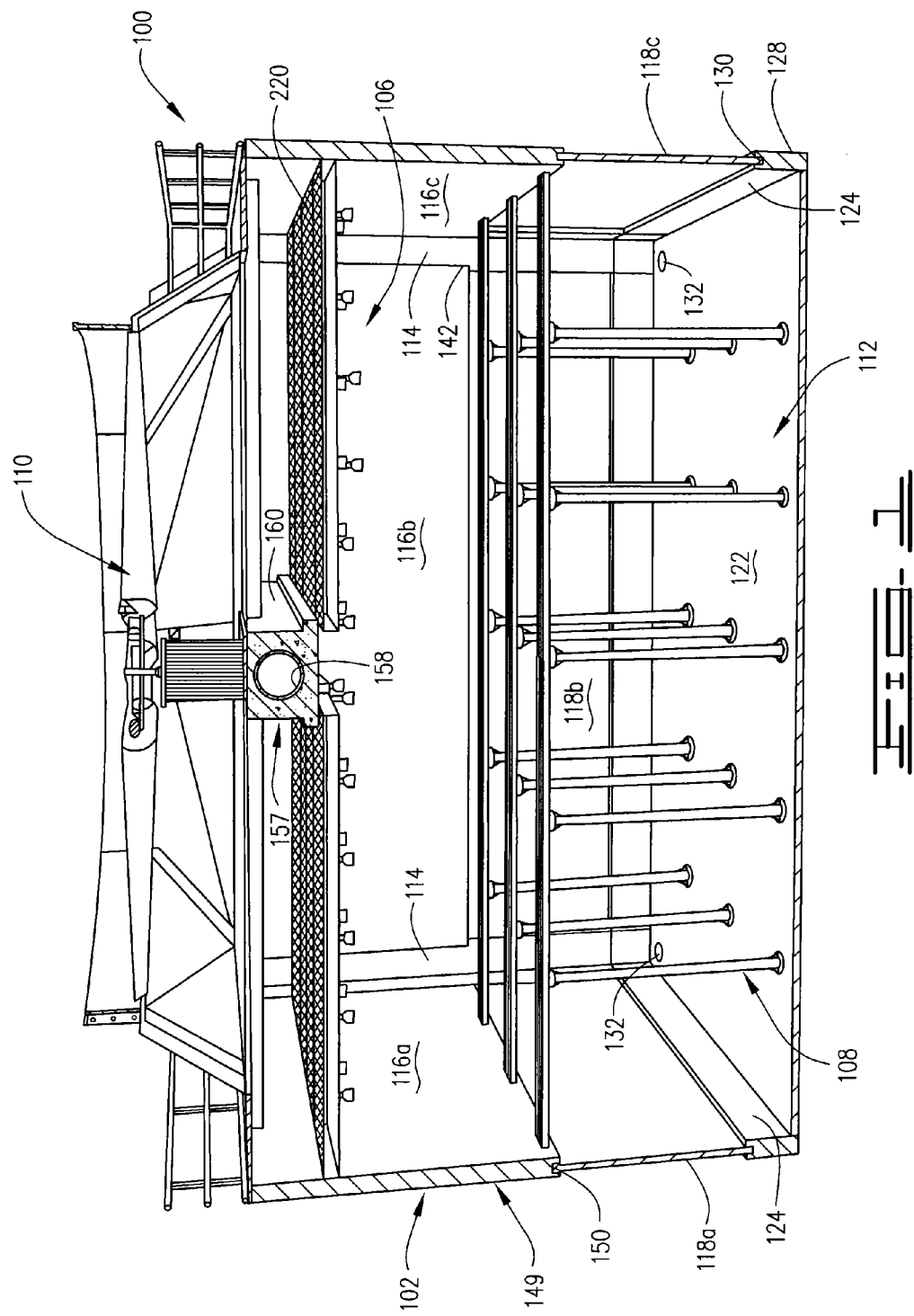
FIG. 1 is a cutaway, front perspective view of a cooling tower constructed in accordance with the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting.

In the following detailed description of embodiments of the disclosure, numerous specific details are set forth in order to provide a more thorough understanding of the inventive concepts disclosed herein. However, it will be apparent to one of ordinary skill in the art that the concepts within the disclosure may be practiced without these specific details. In other instances, well-known features have not been described in detail to avoid unnecessarily complicating the description.

The inventive concepts disclosed herein are to an induced draft industrial cooling tower having a header assembly which supports a top mounted fan assembly and houses a water conduit; the cooling tower is configured to cool water by using induced vertical air counterflow mechanism.

Figure 2:
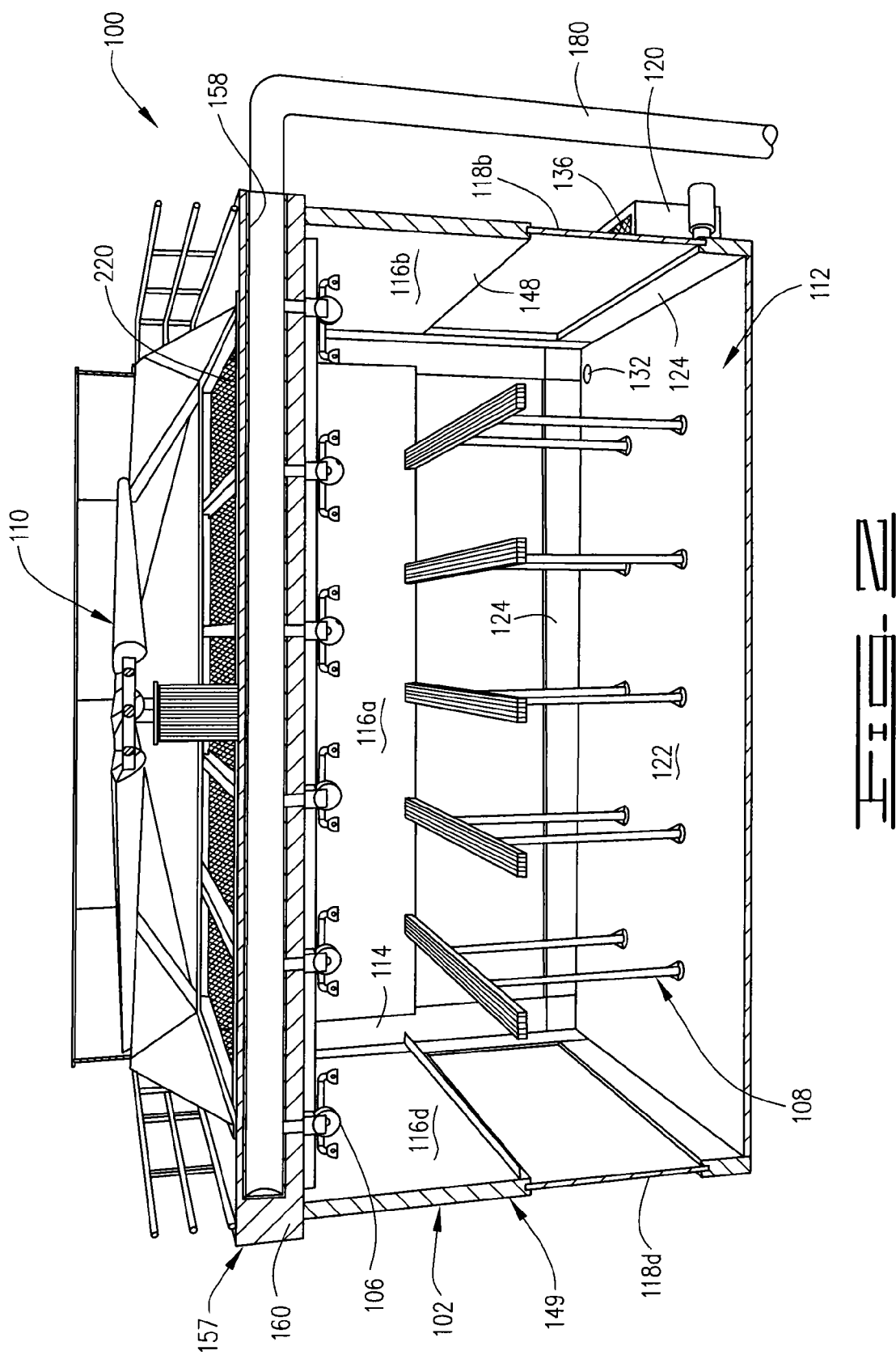
FIG. 2 is a cutaway, side perspective view of the cooling tower shown in FIG. 1.

Referring to the drawings, and more particularly to FIGS. 1 and 2, a cooling tower 100 constructed according to the inventive concepts disclosed herein is shown. Generally, the cooling tower 100 includes a tower assembly 102, a liquid distribution system 106, a fill assembly 108, and a fan assembly 110.

Referring now to FIGS. 1, 2, 4, and 5, the tower assembly 102 comprises a basin 112, a plurality of corner beams 114, a plurality of tilt walls 116a, 116b, 116c, and 116d, a plurality of vertical drift eliminators 118a, 118b, 118c, and 118d, and drainage sumps 120. The basin 112, which is part of a drainage collection system, has a bottom 122, which is shown to be substantially rectangular in shape but can alternatively comprise any desired shape. The bottom 122 is preferably manufactured on-site as a concrete slab, for example. It is to be understood that the bottom 122 can be substantially flat and level, but may also comprise a slope in order to direct water flow.

The basin 112 further comprises basin walls 124 extending substantially vertically from the bottom 122. The basin walls 124 connect to one another and cooperate with bottom 122 to define the basin 112. The basin walls 124 comprise edges 128 that may be formed to have notches 130 at least partially along the lengths thereof.

The basin 112 is provided with drainage apertures 132 to allow for the drainage of water from the basin 112. While two drainage apertures 132 are shown located on the basin bottom 122, it is to be understood that any number and/or configuration of drainage apertures 132 may be shown, such as one central drainage aperture or four corner drainage apertures for example. It is to also be understood that no drainage apertures may be used, and the drainage may be provided by other suitable means known in the art such as a drainage conduit, for example. The drainage apertures 132 can cooperate with an optional slope in the bottom 122 in order to ensure adequate water drainage from the basin 112.

The drainage sumps 120 (FIGS. 1 and 5) are substantially identical in structure and function, and therefore only one drainage sump 120 will be discussed in detail herein. The drainage sump 120 may comprise a substantially rectangular concrete box, which is at least partially disposed at a lower elevation than the bottom of the basin 112. It is to be understood that the drainage sump 120 can be made of other materials such as metals, plastics, FRP, PVC, and resins for example. A conduit (not shown) connects the drainage aperture 132 to the drainage sump 120, in such a way as to allow the water from inside the basin 112 to fall into the drainage sump 120 under the force of gravity. The drainage sump 120 further comprises a screen 136, through which screen 136 water passes prior to entering the drainage sump 120. The screen 136 serves to separate particulate matter from the water in order to keep the drainage sump 120 from clogging. The screen 136 may be any screen known in the art, and may have varying sizes depending on the operational variables of a specific cooling tower 100.

The drainage sump 120 further comprises a discharge conduit (not shown) used to drain the water from the drainage sump 120. It is to be understood that while one drainage sump 120 is shown in FIG. 2, any number of drainage sumps can be used, ranging from two to a plurality of drainage sumps 120. Additionally, a drainage sump 120 may be shared by two or more cooling towers 100 by having the drainage sump 120 in fluid communication with the drainage apertures 132 of two or more cooling towers 100. It is to be further understood that water from the basin 112 may be drained by any other means known in the art without using a drainage sump 120.

The corner beams 114 are preferably made of concrete, but any other material of suitable strength and durability may be used. The corner beams 114 are shown to have an L-shaped cross-section which may include two arms having substantially equal lengths and widths, and being substantially perpendicular to one another. It is to be understood that the corner beam 114 may have varying shapes such as substantially square, substantially triangular, or substantially rectangular, for example.

The corner beams 114 extend substantially vertically from the basin 112 and may be formed as a unitary structure with the basin 112, or may be attached to the basin 112 by any suitable means such as welds, bolts, rivets, clamps, and adhesives, for example. The corner beams 114 preferably have elongated notches 142 formed at least partially along the length thereof with the notches 142 of any two corner beams 114 configured to cooperate to receive the ends of one of the tilt walls 116a, 116b, 116c, or 116d, as will be described below.

The tilt walls 116a, 116b, 116c, and 116d are substantially identical in structure and function; therefore, only the tilt wall 116 will be described in detail herein. The tilt wall 116 can be substantially rectangular in shape or substantially square in shape depending on the basin 112 configuration. The tilt wall 116 has two ends 144, a top 146, and a bottom 148. The two ends 144 have substantially identical lengths, sized such that the ends 144 fit into the notches 142 of the corner beams 114, such that the tilt wall 116 is vertically and longitudinally supported by two of the corner beams 114. When assembled, the tilt walls 116a, 116b, 116c, and 116d cooperate to define an enclosure 149 (FIG. 1). The tilt wall 116 is preferably positioned directly above the basin wall 124 such that it is oriented substantially parallel to the basin wall 124 and is separated from the basin wall 124 by a distance. The bottom 148 of tilt wall 116 has a notch 150 formed in at least a part of the length thereof, and the notch 150 is configured to cooperate with notch 130 of the basin wall 124. The tops 146 of tilt walls 116b and 116d have notches 117b and 117d formed therein for supporting the liquid distribution system 106 as will be described below. The tilt wall 116 is preferably made of concrete, and may be cast on-site by using the basin 112 as a mold in a manner known in the art.

The tilt wall 116 can be tilted into place and the ends 144 engaged inside the notches 142. The ends 144 may be secured inside notches 142 by any suitable means, such as rivers, bolts, clamps, adhesives, bonding, welds, mortar, or brackets for example. It is to be understood that the tilt wall 116 can be made of any suitable material such as aluminum, stainless steel, PVC, and FRP for example, and may be pre-cast off-site and transported to cooling tower 100 installation locations. It is to be further understood that tilt wall 116 may comprise an optional protective lining as an adhered system liner for example, for harsh water or chemical cooling environments. The protective lining can also be a coating or wafer panels attached to the tilt wall 116.

The vertical drift eliminators 118 are substantially rectangular in shape, and have two ends 152, a top 154, and a bottom 156. The vertical drift eliminator 118 is configured such that the bottom 156 is engageable with notch 130 of the basin walls 124, and top 154 is engageable with notch 150 of the tilt wall 116a. The ends 152 of the vertical drift eliminator 118 fit against the sides of corner beams 114. The vertical drift eliminators 118a, 118b, 118c, and 118d define an enclosure which provides internal basin ultraviolet light (or "UV light") elimination for health and safety concerns, including increased water quality. The vertical drift eliminator 118 also functions to decrease water "drift" adjacent to and at the exterior of the tower assembly 102 sides. The vertical drift eliminator 118 can be made of any material known in the art.

Referring now for FIGS. 1, 2, 3, and 5-7, the liquid distribution system 106 includes a liquid distribution header assembly 157 which is shown to include at least one feeder conduit 158 encased in a monolithic casting of concrete defining a beam 160. The feeder conduit 158 has a first end 176 and a second end 178. The first end 176 of the cylindrical pipe 172 is preferably closed by a blind cap (not shown) or by any other suitable means. Alternatively, the first end 176 may be open and the pipe may be sealed by the concrete of the beam 160. The second end 178 of the feeder conduit 158 is open and configured to be connected to a hot water supply pipe 180. The feeder conduit 158 may be made of any suitable material such as PVC, RFP, copper, stainless steel, aluminum, and resins for example.

The beam 160 is preferably substantially rectangular in shape and has a top 162, a side 164, and a bottom 166, and is sized such that the beam 160 is slidably receivable in the notches 117b and 117d (best shown in FIG. 5) of the tilt walls 116b and 116d and has a length longer than the distance between the two tilt walls 116b and 116d whereby the beam 160 extends beyond the tilt walls 116b and 116d. The beam 160 is shown to have two end caps 168 formed thereon having a width greater than the width of notches 117b and 117d of tilt walls 116b and 116d and configured to engage notches 117b and 117d such that the weight of the header assembly 157 is supported by tilt walls 116b and 116d. The two end caps 168 engage the tilt walls 116b and 116d in such a way as to provide further lateral support to the tower assembly 102. The concrete casting may be formed about the feeder conduit 158 on-site or can be made at remote locations and transported to water cooling tower 100 construction sites. It should also to also be understood that the header assembly 157 may be secured to the tops 146 of the tilt walls 116 by any suitable means (not shown) such as welds, bolts, clamps, adhesives, flanges, rivets, and screws for example.

The header assembly 174 further includes a plurality of distribution conduits 179 that are in fluid communication with the feeder conduits 158 and encased in the monolithic casting of concrete defining the beam 160. The distribution conduits 179 are spaced apart from one another and through the bottom 166 of the beam 160 and along the length thereof.

Figure 5:
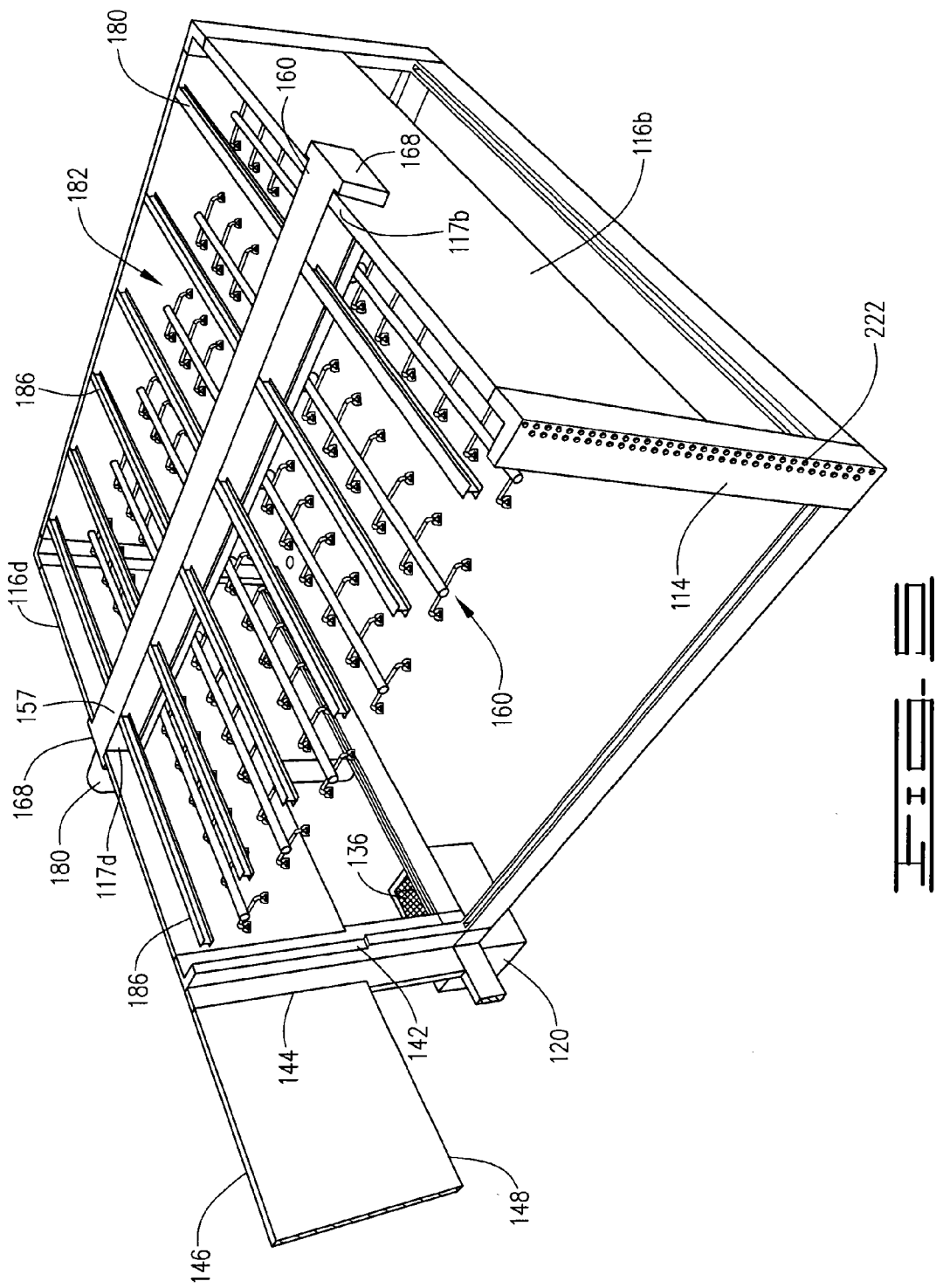
FIG. 5 is a perspective view of a tower assembly and a water distribution assembly.

Referring now to FIGS. 5-7, the liquid distribution system 106 further includes a water distribution support assembly 182, a plurality of fittings 206, a plurality of pipes 208, and a plurality of nozzle assemblies 212.

The water distribution support assembly 182 includes a plurality of upper beams 186 made from any suitable material, such as FRP. The upper beams 186 are sized to span the distance between the sides 164 of the beam 160 and the tilt walls 116a and 116c. The upper beams 186 have a top 188, sides 190, a bottom 192, and ends 194. The ends 194 of the upper beams 186 are attached to the sides 164 of the beam 160 and to the tilt walls 116a and 116c by any means known in the art, such as bolts, rivets, welds, clamps, brackets, screws, brackets, and adhesives, for example. The upper beams 186 are preferably substantially perpendicular to the tilt walls 116a and 116c and to the header assembly 157, but it is to be understood that other angles can be used. The upper beams 186 have a plurality of apertures (not shown) formed into the bottoms 192 thereof, which apertures may have threads formed therein. The upper beams 186 function to support the weight of the liquid distribution system 106 as will be described below.

The water distribution support assembly 182 further has a plurality of lower beams 196. The lower beams 196 are positioned below the upper beams 186 and are attached to the upper beams 186 via connectors 198 and connected to the lower beams 196 via C-clamps 204 such that the lower beams 196 are suspended below the upper beams 186 at a distance from the bottom 192 of the upper beams 186, and are substantially perpendicular to the tilt walls 116a and 116c. It is to be understood that the connectors 198 can be any suitable device, such as rods, steel cables, brackets, and flanges, for example. It is to also be understood that the upper beams 186 and the lower beams 196 can comprise a unitary structure. The upper beams 186 and lower beams 196 can be made of any suitable material such as PVC, or FRP, for example.

The fittings 206 are connected to the distribution conduits 179. The fittings 206 can be any suitable fittings, such as a tee fitting. One of the pipes 208 is connected to each end of the fittings 206 by any suitable means, such as threads or adhesive, for example, and extends substantially parallel to the lower beams 196. The pipes 208 are substantially cylindrical in shape and connected to the beams with C-clamps 204, or by any other suitable means, including welds, brackets, bolts, screws, and adhesives for example. The pipes 208 can be made of any suitable material such as PVC, FRP, plastics, resin, copper, stainless steel, and aluminum for example. The combined lengths of the pipes 208 and the fittings 206 substantially span the distance between the tilt walls 116a and 116c. It is to be understood that the fittings 206 and the pipes 208 may be formed as a single piece rather than as separate pieces.

Lateral pipes 210 may be extended from multiple points along the length of the pipes 208. The lateral pipes 210 are in fluid communication with the pipes 208 and are connected to the pipes 208 by any suitable means such as threads, adhesives, bolts, flanges, screws, and welds for example. It is to be understood that the fittings 206, the pipes 208, and the lateral pipes 210 may be formed as a single piece rather than as separate pieces.

The nozzle assemblies 212 are connected to the lateral pipes 210 and are in fluid communication with the lateral pipes 210. The nozzle assemblies 212 function to discharge water therethrough to obtain a uniform distribution of water over the fill assembly 108. The nozzle assemblies 212 may be any nozzle assemblies known in the art.

A horizontal drift eliminator 220 is disposed between the lower beams 196 and the upper beams 186, such that the weight of the horizontal drift eliminator 220 is supported by arms of the lower beams 196 when the lower beams 196 are in the form of a T-beam. The horizontal drift eliminator 220 is oriented substantially parallel relative to the bottom 122 of basin 112. The horizontal drift eliminator 220 functions to reduce the upward drift of water and provide a substantially UV-free environment inside the cooling tower 100.

Referring now to FIG. 5, shown therein is an embodiment of a configuration wherein the corner beams 114 are T-shaped corner beams configured to duplicate one or more second modular cooling towers 100 inline and contiguous with a first modular cooling tower 100. A plurality of threaded inserts 222 are attached to the corner of a corner beam 114, such that the plurality of threaded inserts 222 forms a substantially vertical row. The corner beam 114 of a second cooling tower 100 can then be attached to the corner beam 114 of a first cooling tower 100 via the threaded inserts 222, such that the first and second cooling towers 100 are disposed adjacent to one another in a parallel tilt wall 116a to a tilt wall 116a orientation, with the tilt walls 116a of each cooling tower 100 being substantially parallel to each other. This modularization provides the ability to customize the total cooling capacity by selecting an appropriate size and number of modular cooling towers 100. The modularization also allows for adding cooling capacity to an existing cooling tower 100.

Referring now to FIGS. 8A-8B, the fill assembly 108 constructed according to the inventive concept disclosed herein is shown. The fill assembly 108 comprises a plurality of support members 224, a plurality of floor insert sleeves 226, a plurality of caps 228, a plurality of grated platforms 230, and fill material 242.

The support members 224 may be a cylindrical pipe and made of PVC, or any other suitable material, such as FRP, resins, steel, aluminum, and copper for example. The support members 224 have a first end 232 and a second end 234.

The floor insert sleeves 226 are connected to the bottom 122 of the basin 112. The floor insert sleeves 226 can be cast in place with the basin bottom 122, or can be attached to bottom 122 by any suitable means such as bolts, brackets, flanges, screws, rivets, welds, and adhesives for example. The floor insert sleeves 226 are configured to receive the first ends 232 of the support members 224, such that the floor insert sleeves 226 support the support members 224 in a substantially vertical orientation relative to the bottom 122. This configuration reduces construction time, as well as loss of air flow, and allows for a 90 degree air flow turn thus providing higher efficiency with round columns. It is to be understood that the support members 224 and the floor insert sleeves 226 may alternatively comprise a unitary structure.

The caps 228 are configured to receive the second ends 234 of the support members 224 therein such that the caps 228 are secured onto the support members 224. The caps 228 can be secured to the second ends 234 of the support members 224 by any suitable means, such as threads, bolts, flanges, screws, brackets, resins, adhesives, and welds for example. The caps 228 can be made of any suitable material such as PVC, FRP, resins, plastics, steel, aluminum, or other metals for example. It is to be understood that the caps 228, the support members 224, and the floor insert sleeves 226 may alternately comprise a unitary structure.

Each of the grated platforms 230 is a framework of parallel or latticed bars and configured to have a flat top 236 and a bottom 238. The bottom 238 is attached to one or more of the caps 228 such that the grated platforms 230 are supported by the caps 228. The bottom 238 is configured to attach the grated platforms to the caps 228 by any suitable means such as bolts, rivets, clamps, flanges, adhesives, and welds, for example. The grated platforms 230 may be made from any suitable material, such as PVC, FRP, plastics, and metals, for example. The weight of the fill material 242 may also be partially supported by a ledge 244 formed along the tilt wall 116 (FIG. 8A).

The fill material 242 can be any fill material used in the art, provided that it allows air to flow upwards therethrough and water to flow downwards therethrough in a countercurrent manner. The fill material 242 as shown is shaped as substantially rectangular sheets, but it is to be understood that the fill material can have other suitable shapes. It is to be understood that the fill assembly 108 may alternatively comprise a unitary piece.

Figure 9B:
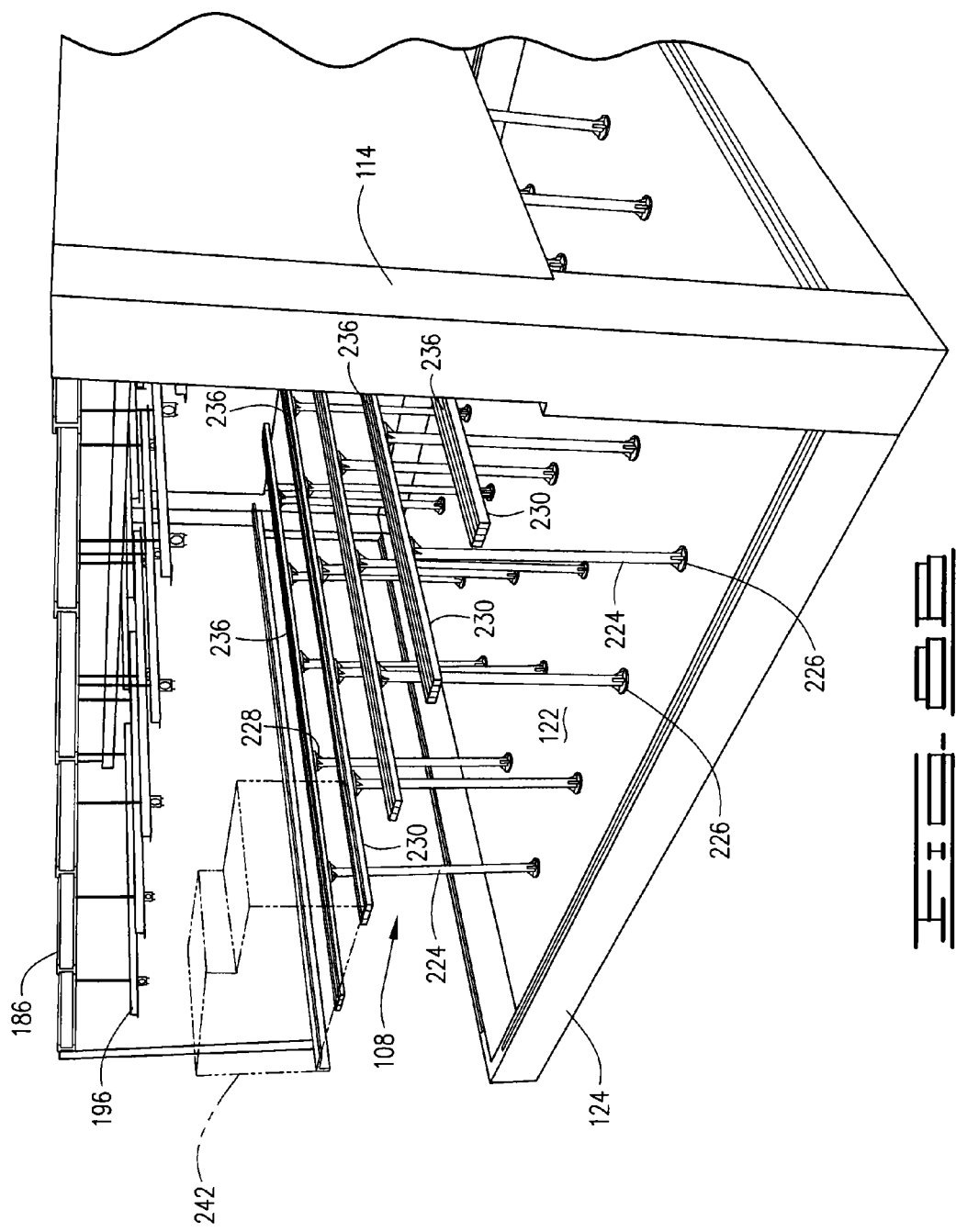
FIG. 9B is a top perspective view of the fan assembly shown in FIG. 9A, with the shroud assembly removed for clarity.
Figure 9A:
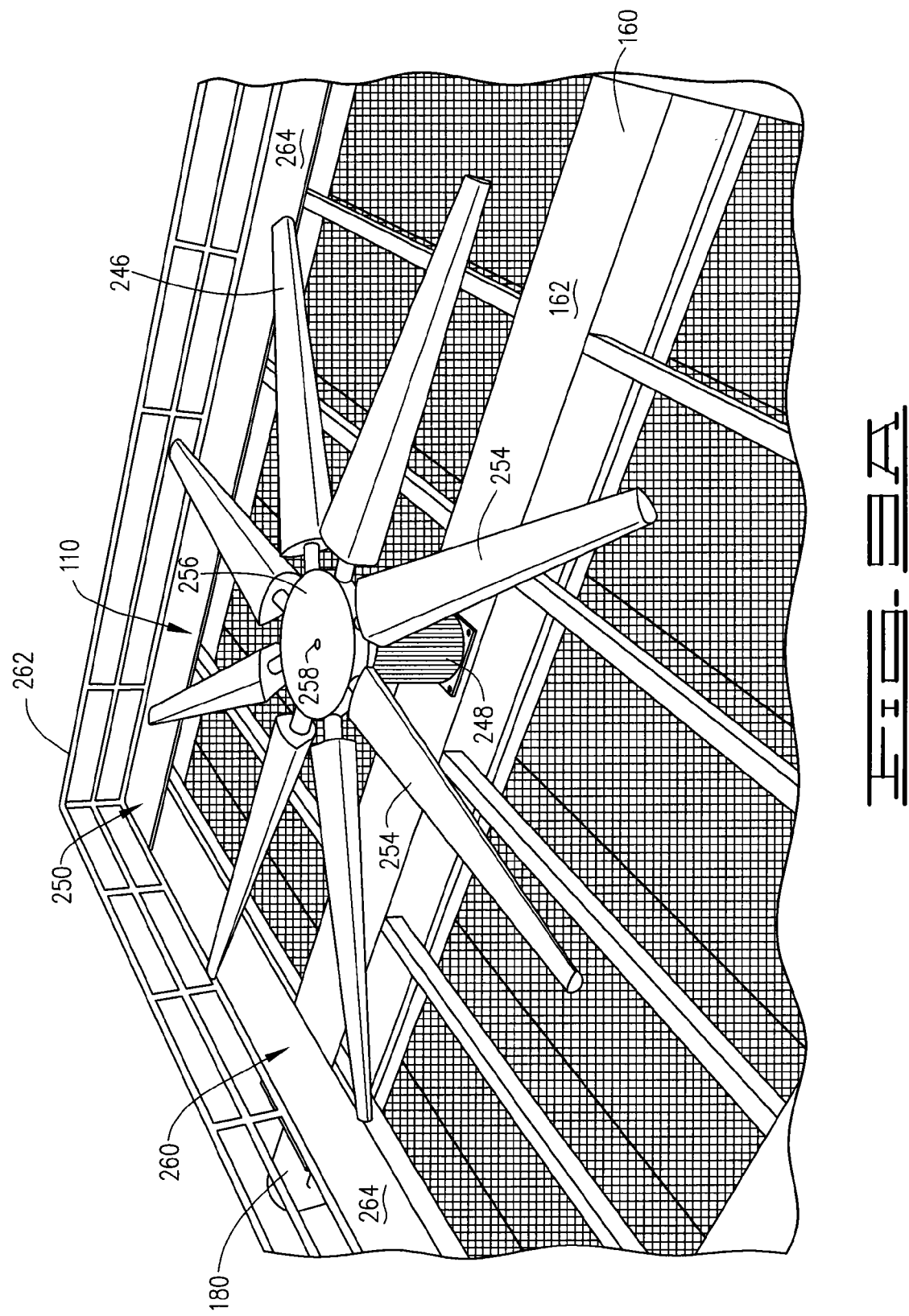
FIG. 9A is a top perspective view of a fan assembly shown connected to a header assembly.
Figure 9B:
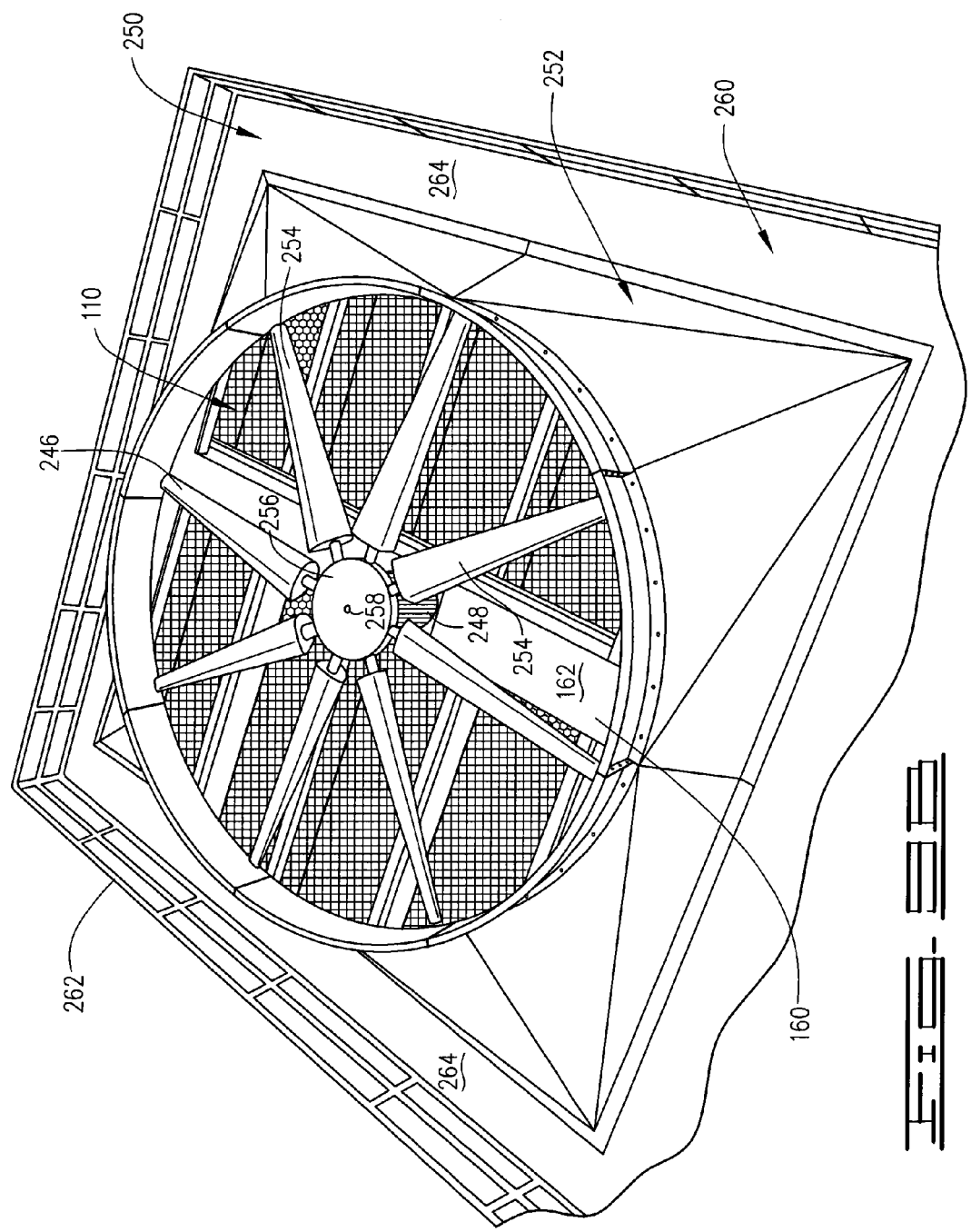

Referring now to FIGS. 9A-9B, the fan assembly 110 is shown to include a fan 246, a motor 248, a maintenance assembly 250, and a shroud assembly 252. The fan 246 has a plurality of blades 254 extending radially from a hub 256. The hub 256 is connected to a rotor shaft (not shown) and is configured to rotate around a center axis 258. The rotor shaft (not shown) connects the fan 246 to the motor 248. The motor 248 can be any motor of appropriate size and power, such as an electromagnetic motor, an internal combustion engine, or a steam turbine, for example. The motor 248 may comprise a gear box (not shown) for adjusting the speed of the motor 248.

The fan assembly 110 is preferably connected to the top 162 of the beam 160 of the header assembly 157 such that the center axis 258 of the hub 256 is substantially centered relative to the top 162 of the beam 160. The motor 248 is directly connected to the top 162, and may be attached to the top 162 via any suitable means such as welds, bolts, brackets, flanges, screws, adhesives, rivets, and clamps for example. Alternatively, a pad (not shown) or a flange (not shown) may be disposed between the motor 248 and the top 162 in order to dampen/absorb vibrations caused by motor 248 operation and/or provide for a stronger connection between the motor 248 and the top 162. The motor 248 functions to rotate the hub 256 about its center axis 258 such that the blade 254 is rotated and a volume of air is drawn upwards through the cooling tower 100.

The maintenance assembly 250 comprises a walk deck assembly 260 and a safety rail 262. The walk deck assembly 260 comprises walk decks 264. The walk decks 264 are substantially rectangular in shape and are connected to the tops of the corner beams 114 and the tilt walls 116a, 116b, 116c, and 116d. The walk decks 264 are positioned substantially perpendicular to one another, and substantially parallel to the bottom 122 of the basin 112, such that four walk decks form a rectangular frame around the top of the cooling tower 100. The walk decks 264 may also be partially supported by the upper beams 186. The walk decks 264 can be made of any suitable material having suitable weight, strength, and corrosion resistance, such as PVC, FRP, plastics, aluminum, steel, or other metals for example. The walk deck assembly 260 may alternatively comprise a single walk deck, less than four walk decks, and more than four walk decks.

The safety rail 262 extends vertically from the outer edge of the walk deck assembly 260 and serves to protect maintenance personnel from falling off the edge of the cooling tower 100. The safety rail 262 defines a substantially rectangular rail and is connected to the tilt walls 116 and to the corner beams 114. The safety rail 262 can be any safety rail known in the art, and can be made of any material having suitable strength, weight, and corrosion resistance such as steel, aluminum, PVC, FRP, or other metals for example. An access ladder (not shown) is used to provide maintenance personnel with access to walk decks 264.

Figure 10A:
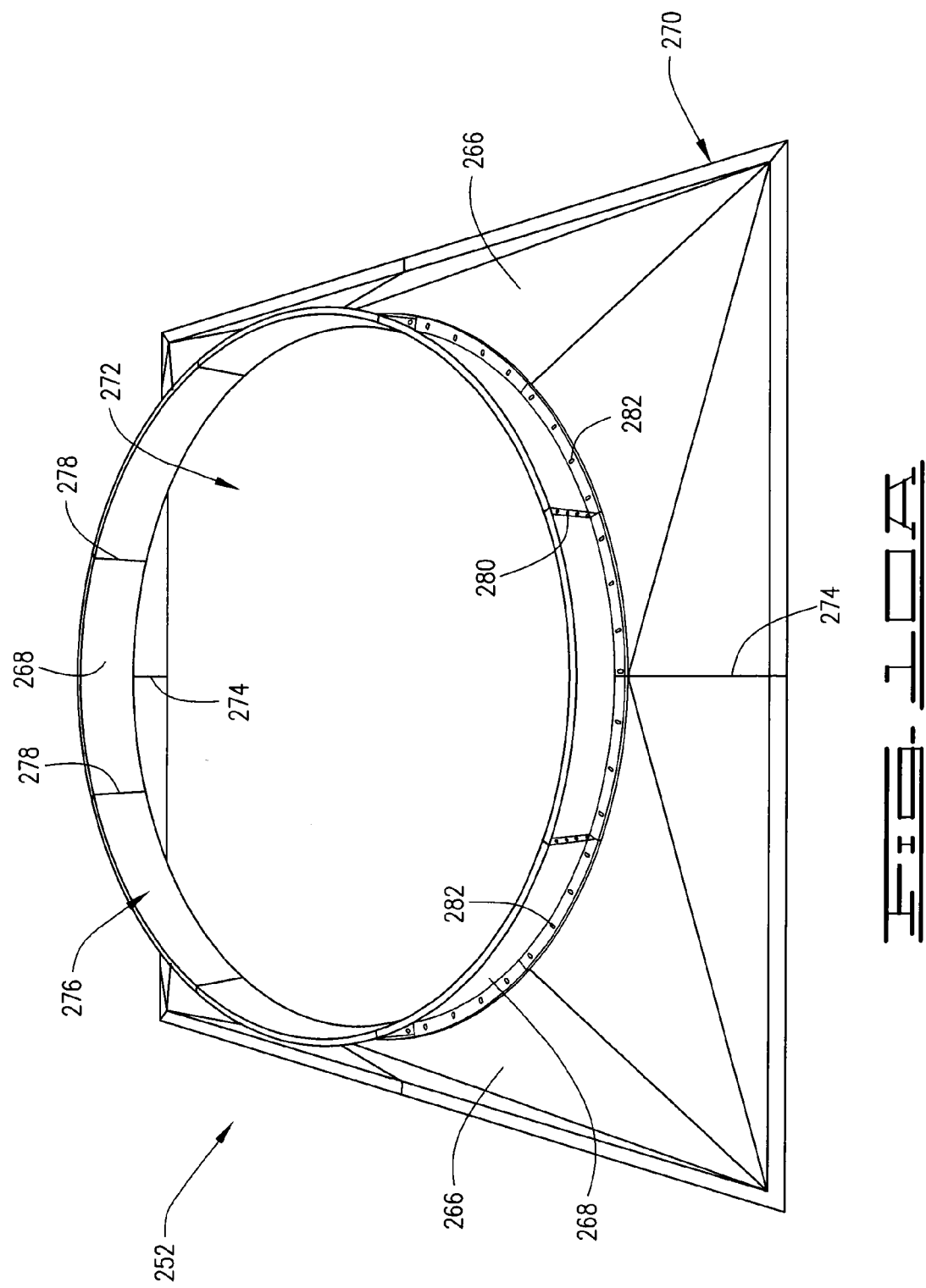
FIG. 10A is a perspective view of the shroud assembly.

Referring now to FIGS. 10A-10B, the shroud assembly 252 comprises base pieces 266 and plenum sections 268. The base pieces 266 are attached to one another and cooperate with one another to define a substantially rectangular shroud base 270 and a substantially circular opening 272. The base pieces 266 are joined together such that joints 274 are formed. The base pieces 266 are attached to the upper beams 186 such that the shroud base 270 is at least partially supported by the upper beams 186. The base pieces 266 may also be at least partially supported by the tilt walls 116, the header assembly 157, and/or the corner beams 114. The base pieces 266 can be made of any material having sufficient strength, corrosion resistance, and weight, such as aluminum, plastics, stainless steel, PVC, and FRP, for example. It is to be understood that any number of base pieces 266 may be used.

The plenum sections 268 are configured to cooperate to define a substantially circular air plenum 276. The plenum sections 268 can be made of any suitable material having suitable weight, strength, and corrosion resistance, such as aluminum, stainless steel, PVC, FRP, or other plastics, for example. The plenum sections 268 are attached to one another at seams 278 by inserting bolts (not shown) through attachment apertures 280. The plenum sections 268 are attached to the shroud base 270 by inserting bolts (not shown) through adjustment slots 282. The air plenum 276 is sized such that the blades 254 of the fan 246 are at least partially disposed within the air plenum 276.

A major concern of fan efficiency deals with tolerances and blade tip clearances. An exemplary embodiment of a cooling tower constructed according to the present disclosure comprises an air plenum 276 shaped as a substantially exact circle of a suitable diameter according to the diameter of the fan 246. To achieve a substantially exact circle, an exemplary embodiment of the inventive concept(s) disclosed herein utilizes an adjustable fan shroud assembly 252 as follows: Once the fan assembly 110 has been mounted and the base pieces 266 have been joined together and attached to the tower assembly 102, the plenum sections 268 are attached to the base pieces 266. The plenum sections 268 are moved radially inwardly to the point where the plenum sections 268 come in contact the blades 254 of the fan 246. A plurality of shims or spacers 284 are then used to adjust the diameter of the air plenum 276 defined by the plenum sections 268 by inserting the spacers 284 into each of two diametrically opposed seams 278. This results in slightly enlarging the diameter of the air plenum 276. This step is repeated with successive pairs of diametrically opposed seams 278 until sufficient clearance is achieved between the air plenum 276 and the blades 254. The positions of the plenum sections 268 are then secured by fully tightening the bolts inserted through adjustment slots 282. Additionally, the plenum sections 268 forming the air plenum 276 are rotated to provide added rigidity, in a manner such that the seams 278 of the plenum sections 268 are not in alignment with the joints 274 of adjacent base pieces 266. It is to be understood that any number of plenum sections 268 may be used, ranging from two to more than eight, provided that the number of plenum sections 268 used allows for air plenum 276 adjustability.

Access to the fan 246 area can be limited due to the shroud assembly 252 configuration. Ladder brackets (not shown) or other suitable means can be utilized to access the fan 246 and the motor 248 during maintenance operations and/or shutdown/lockout.

A cooling tower 100 according to the present disclosure would benefit from a low pump head due to overall height not previously allowed in a top mounted fan cooling towers.

A method for constructing a water cooling tower according to the inventive concept(s) disclosed herein generally comprises first pouring a concrete basin bottom 122, drainage sumps 120, and corner beams 114. Once the bottom 122, drainage sumps 120, and corner beams 114 have cured, tilt walls 116 are poured using the bottom 122 as a mold and allowed to cure. The header assembly 157 is also poured and allowed to cure. The cured tilt walls 116 are attached to the corner beams 114. Next, the header assembly 157 is installed, and the water distribution support assembly 182 is mounted. The horizontal drift eliminators 220 are also mounted. The water distribution system 184 is then mounted. The fan assembly 110 is installed next. The shroud assembly 252 is adjusted to ensure adequate clearance. The fill assembly 108 and fill material 242 are installed. The vertical drift eliminators 118 are mounted, and the cooling tower 100 is connected to the hot water pipe 180 and the sump(s) is connected to a discharge conduit.

In operation, a cooling tower constructed in accordance with the inventive concept(s) disclosed herein operates by drawing air sideways through the vertical drift eliminators, and then upwards through the support base, fill material, water distribution assembly, horizontal drift eliminator, and air plenum. Hot water is pumped through the header and the water distribution assemblies. The water is distributed by the nozzles and falls through the fill material under the force of gravity in a direction opposite to the direction of the air draft. The water is cooled by this process. The cooled water falls into the basin, and drains into the drainage sumps by passing through a screen to filter out particulate contaminants. The cooled water can then be removed from the sumps and may be used to cool machinery and/or equipment. The water from the sumps may eventually be recycled through the cooling tower thus completing a full cycle. The warm air is vented to the atmosphere.

While embodiments of the inventive concept(s) disclosed herein have been described as using water and being water cooling towers, it is to be understood that other cooling liquids may be used in a cooling tower constructed according to the inventive concepts disclosed herein. Additionally, the term "water" as used herein expressly comprises any chemical and/or other additives that may be used in the cooling industry such as pH buffers, salts, anti-freezing agents, water-softening agents, limescale removing agents, and biocidal agents, for example.

While presently preferred embodiments of the inventive concepts disclosed herein have been described for purposes of this disclosure, it will be understood that numerous changes may be made which will readily suggest themselves to those skilled in the art and which are accomplished without departing from the inventive concepts disclosed and claimed herein.

What is claimed is:

1. A cooling tower, comprising:
    an enclosure;
    a body of fill material supported inside the enclosure;
    a liquid distribution system supported above the fill material for distributing a liquid over the fill material in such a way the liquid gravitates downward through the fill material, the liquid distribution system including a liquid distribution header assembly comprising at least one feeder conduit encased in a monolithic casting of concrete, the header assembly traversing the enclosure and being positioned on the enclosure such that the header assembly is supported by the enclosure;
    a drainage collection system located below the fill material for collecting the liquid that gravitates through the fill material; and
    a fan assembly mounted directly to the header for drawing air upward through the fill material.

2. The cooling tower of claim 1 wherein the header assembly is slidably received in at least two notches formed in the enclosure.

3. The cooling tower of claim 2 wherein the header assembly has a first end and a second end, wherein the first end and the second end are each provided with a cap having a width greater than the width of the notches of the enclosure, and wherein each cap of the header assembly is positioned on an exterior side of the enclosure.

4. The cooling tower of claim 1 wherein the liquid distribution system further comprises a plurality of distribution conduits at least partially encased in the monolithic casting of concrete and in fluid communication with the feeder conduit.

5. The cooling tower of claim 4 wherein the distribution conduits extend through a bottom side of the header assembly.

6. The cooling tower of claim 1 further comprising a shroud surrounding the fan assembly, the shroud comprising a plurality of sections such that the sections are radially movable relative to one another to permit the diameter of the shroud to be adjusted.

7. The cooling tower of claim 1 wherein the drainage collection system includes a concrete basin and a plurality of vertically extending corner posts, and wherein the enclosure comprises at least one concrete panel extending between adjacent corner posts.

8. The cooling tower of claim 7 wherein at least two of the concrete panels have a notch formed in an upper end thereof and wherein the header assembly is positioned in the notches.

9. The cooling tower of claim 8 wherein the header assembly has a first end and a second end, wherein the first end and the second end are each provided with a cap having a width greater than the width of the notches of the concrete panels of the enclosure, and wherein each cap of the header assembly is positioned on an exterior side of the concrete panels.

10. The cooling tower of claim 1 further comprising a fill material support assembly comprising a plurality of vertically supported grated platforms.

\* \* \* \* \*